US012691895B2

(12) United States Patent (10) Patent No.: US 12,691,895 B2
Monninger et al. (45) Date of Patent: Jul. 28, 2026

(54) SYSTEM AND METHOD FOR RIGHT-OF-WAY DETERMINATION BASED ON SENSOR DATA FROM FLEET VEHICLES

(71) Applicant: Mercedes-Benz Group AG, Stuttgart (DE)

(72) Inventors: Thomas Monninger, Sunnyvale, CA (US); Anja Severin, Stuttgart (DE); Mario Aleksic, Stuttgart (DE); Alexander Bracht, Stuttgart (DE); Michael Henzler, Stuttgart (DE); Michael Mink, Stuttgart (DE); Tobias Mahler, Stuttgart (DE); Roland Ortloff, Stuttgart (DE); Andreas Silvius Weber, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 156 days.

(21) Appl. No.: 18/076,284

(22) Filed: Dec. 6, 2022

(65) Prior Publication Data

US 2024/0182064 A1     Jun. 6, 2024

(51) Int. Cl.
*B60W 60/00* (2020.01)
*G01C 21/00* (2006.01)

(52) U.S. Cl.
CPC ....... *B60W 60/001* (2020.02); *G01C 21/3815* (2020.08); *G01C 21/3885* (2020.08); *B60W 2554/4046* (2020.02); *B60W 2555/60* (2020.02)

(58) Field of Classification Search
CPC ....... B60W 60/001; B60W 2554/4046; B60W 2555/60; G01C 21/3815; G01C 21/3841;
(Continued)

(56) References Cited

U.S. PATENT DOCUMENTS

2006/0155464 A1* 7/2006 Smartt ............... G01C 21/3844
701/450
2015/0134233 A1 5/2015 Wolf
(Continued)

FOREIGN PATENT DOCUMENTS

CN 109598927 4/2019
CN 110619340 12/2019
(Continued)

OTHER PUBLICATIONS

Wang Jing et al: "Automatic intersection and traffic rule detection by mining motor-vehicle GPS trajectories", Computers Environment and Urban Systems, vol. 64, Jan. 18, 2017, pp. 19-29.
(Continued)

*Primary Examiner* — Aaron L Troost
(74) *Attorney, Agent, or Firm* — Mahamedi IP Law LLP

(57) ABSTRACT
A computing system can receive sensor data from a set of human-driven vehicles operating through a road segment. The system can process the sensor data to determine a set of right-of-way rules for autonomous vehicle driving through the road segment. In certain examples, the system can obtain an autonomous driving map utilized by autonomous vehicles for operating through the road segment, and modify the autonomous driving map to include the set of right-of-way rules for the road segment.

20 Claims, 6 Drawing Sheets

(58) Field of Classification Search
CPC ............ G01C 21/3844; G01C 21/3848; G01C
21/3885
See application file for complete search history.

(56) References Cited

U.S. PATENT DOCUMENTS

| | | | |
|---|---|---|---|
| 2016/0258764 A1* | 9/2016 | Phuyal | ................. G08G 1/0104 |
| 2018/0066957 A1* | 3/2018 | Stroila | ............... G01C 21/3841 |
| 2020/0124423 A1 | 4/2020 | Jiang et al. | |
| 2020/0134325 A1 | 4/2020 | Sun | |
| 2021/0166145 A1* | 6/2021 | Omari | .................... G06N 20/00 |
| 2021/0406559 A1* | 12/2021 | Efland | ................. G06V 10/803 |
| 2022/0219720 A1 | 7/2022 | Hartnett | |
| 2023/0186646 A1 | 6/2023 | Ghalyan | |

FOREIGN PATENT DOCUMENTS

| | | |
|---|---|---|
| CN | 107170236 | 5/2020 |
| CN | 111291790 | 3/2021 |
| CN | 113320545 | 8/2021 |
| CN | 114954498 | 8/2022 |
| DE | 102018211941 | 1/2022 |
| EP | 4024366 A1 | 7/2022 |

OTHER PUBLICATIONS

Zourlidou, Stefania, Traffic Regulator Detection and Identification from Crowdshourced Data—A Systematic Literature Review, ISPRS International Jourval of GEO-Information, vol. 8, No. 11, Oct. 31, 2019, p. 491.

International Search Report dated Jan. 26, 2024, APCT International Application No. PCT/EP2023/025494 12 pages.

* cited by examiner

Receive Sensor Data From Fleet Vehicles Operating Through Road Segment
500

Process Sensor Data To Determine Right-Of-Way Rules For Road Segment
505

Obtain Autonomous Driving Map Utilized By Autonomous Vehicles For Operating Through Road Segment
510

Modify Autonomous Driving Map To Include Right-Of-Way Rule(s) For Road Segment
520

Receive Sensor Data From Fleet Vehicles Operating Through Road
Segment
600

Generate Vehicle Traces Of Each Vehicle Through Road Segment On
Map Data
605

Process Vehicle Traces To Determine Right-Of-Way Rule(s) For Road
Segment
610

Verify Autonomy Map
For Road Segment
615

Edit Autonomy Map For
Road Segment
620

Generate Autonomy
Map For Road Network
625

SYSTEM AND METHOD FOR RIGHT-OF-WAY DETERMINATION BASED ON SENSOR DATA FROM FLEET VEHICLES

BACKGROUND

Current autonomous driving implementations utilize high-precision autonomy maps recorded by mapping vehicles and labeled based on signage and traffic signals. In some cases, labor intensive human labeling is performed on the autonomy maps, which can result in inaccuracies and other errors. In addition to basic geometric environmental information, such as lane markings and sign positions, the autonomy maps can also include semantic information such as right-of-way rules for specified road segments of a road network. In certain situations (e.g., due to region-specific rules or obscuring of traffic signs), right-of-way rules cannot be perceived directly by on-board sensors of the mapping vehicles, which can result in additional technical problems in producing highly accurate and up-to-date autonomy maps for autonomous and/or semi-autonomous vehicle operation in the road network.

SUMMARY

Systems, methods, and computer program products for determining right-of-way rules for road segments based on sensor data from human-driven fleet vehicles are described in accordance with example embodiments. The system may receive sensor data from a subset of human-driven vehicles operating through a road segment. The system may process the sensor data to determine a set of right-of-way rules for autonomous and/or semi-autonomous vehicle driving through the road segment. In certain examples, the system can obtain an autonomous driving map utilized by autonomous vehicles for operating through the road segment and modify the autonomous driving map to include the set of right-of-way rules for the road segment. Additionally or alternatively, the system can automatically generate and/or label autonomous driving maps for road networks to include the right-of-way rules. In additional embodiments, the system can compare a most recently generated right-of-way label on an autonomous driving map to previously generated right-of-way labels (e.g., to determine road segments with real-world changes of traffic ruling elements between time periods). The system can further be used to validate right-of-way-rules and other traffic ruling elements in existing autonomous driving maps (e.g., to verify whether if these elements are correct and up-to-date).

In various examples, the sensor data can indicate vehicle traces of the human-driven vehicles through the road segment. The vehicle traces can indicate driving behaviors corresponding to a plurality of behavior classes, which can include braking behavior, accelerating behavior, standing behavior, coasting behavior, and turning behavior classes of the subset of human-driven vehicles through the road segment. In certain examples, computing system can superimpose the vehicle traces on map data to determine the set of right-of-way rules. The sensor data received from the subset of human-driven vehicles can generated by a set of odometry sensors of each of the subset of human-driven vehicle. The set of odometry sensors include one or more of a positioning system (e.g., GNSS such as GPS or GLONASS), a braking sensor, a steering input sensor, a wheel speed sensor, or an acceleration sensor. It is contemplated that global position information may be crucial to align a given vehicle trace with other vehicle traces and a prior geometric map in a global frame of reference. The global position information may also be crucial in combining with other sensor information to extract motion patterns and driving behaviors.

As provided herein, the autonomous driving map can be generated based at least in part on map data obtained from one or more mapping vehicles operating through the road segment, and/or labeled autonomous driving rules that correspond to at least one of signage or signals along the road segment. In certain implementations, the computing system can process sensor data from the human-driven vehicles operating throughout the region to determine right-of-way rules for each road segment of a road network of the region. In such examples, the computing system can generate a set of autonomous driving maps for autonomous vehicles driving throughout the road network based on the right-of-way rules determined for each road segment of the road network.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
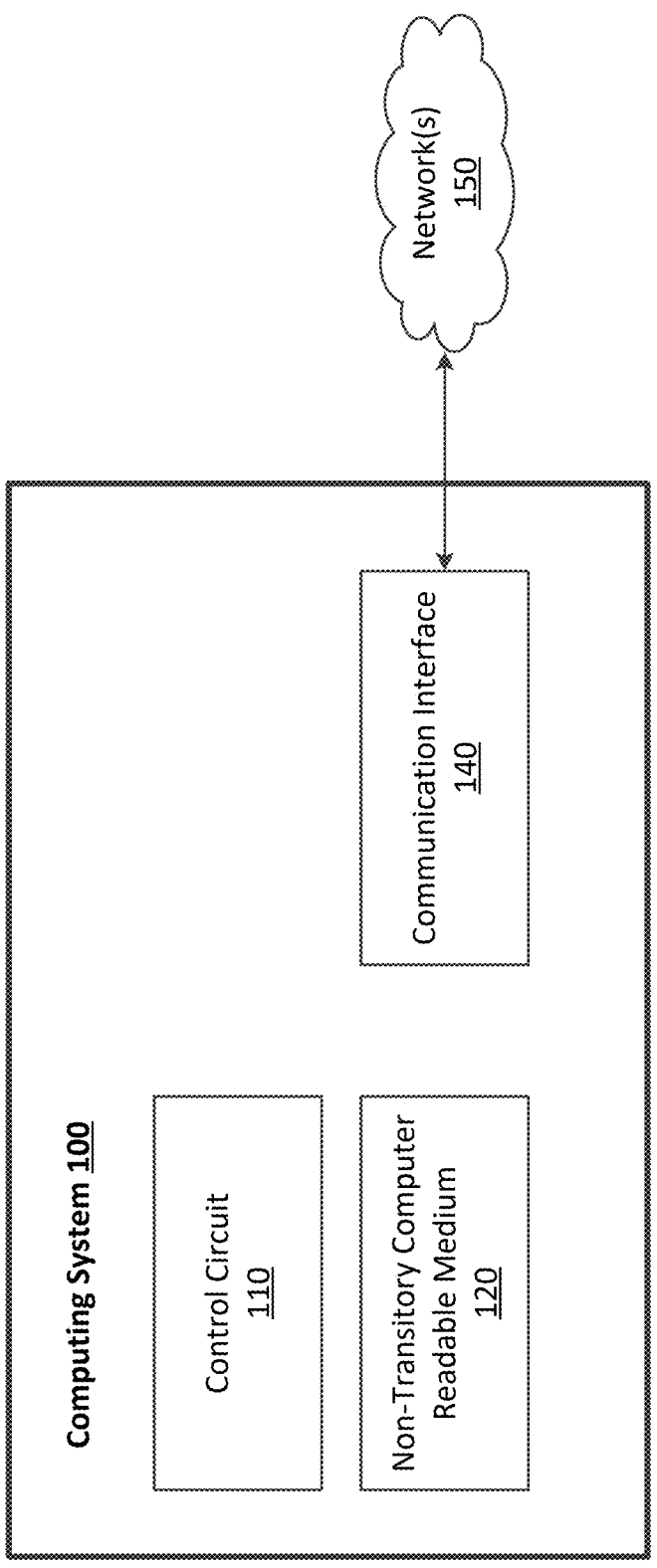
FIG. 1 is a block diagram depicting an example computing system implementing right-of-way determination based on sensor data from fleet vehicles, according to examples described herein.

A computing system is described herein that provides for generating right-of-way information for road segments in autonomy maps based on sensor data received from human-driven fleet vehicles operating through the particular road segments. As provided herein, a fleet vehicle can comprise a human-driven vehicle that includes a set of odometry sensors and a communication interface to transmit, over one or more networks, sensor data generated by the odometry sensors to the computing system. The odometry sensors can include one or more of a positioning system (e.g., a global positioning system (GPS) or other global navigation satellite system (GNSS)), a braking sensor, a steering input sensor, a wheel speed sensor, an acceleration sensor (e.g., an inertial measurement unit), and the like. In various implementations, the computing system can include a communication interface to communicate, over one or more networks, with the human-driven fleets vehicles operating throughout a region. The computing system can receive sensor data from a subset of the human-driven vehicles operating through a particular road segment within the region, and process the sensor data to determine a set of right-of-way rules for autonomous vehicles driving through the road segment.

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

As provided herein, a "right-of-way rule" or "a set of right-of-way rules" is defined as a set of priorities for multiple competing pathways, which can include road lanes (e.g., turning lanes, merging lanes, roundabouts, etc.), pedestrian crosswalks, rail crossings, and the like. The set of priorities determine which competing pathways must yield at any given time to other competing pathways. In common practice, right-of-way is regulated by lane markings, traffic control signals, traffic signage, and local regulations. It is contemplated that the right-of-way rule(s) for competing lanes may changes based on time of day. For example, in certain locales, traffic signals can be active during the daytime and can be deactivated during late night hours. As such, the right-of-way rule(s) for a given road segment may vary between traffic signals and statical signage depending on the time of day.

In certain examples, the computing system can modify an autonomous driving map (also referred to as an autonomy map) that contains the road segment to include the set of right-of-way rules for the road segment. The computing system can include a memory and database that stores autonomous driving maps, or can obtain the autonomous driving maps remotely and append or otherwise edit the relevant autonomous driving maps to include the right-of-way rules for specified road segments as determined from the sensor data of fleet vehicles. A road segment can include one or more lanes that conflict or compete with one or more other lanes, such as turning lanes that merge onto roadways, intersection lanes, on-ramps and off-ramps of freeways, roundabouts, and the like.

As provided herein, an "autonomy map" or "autonomous driving map" comprises a ground truth map recorded by a mapping vehicle using various sensors (e.g., LIDAR sensors and/or a suite of cameras or other imaging devices) and labeled to indicate traffic and/or right-of-way rules at any given location. For example, a given autonomy map can be human-labeled based on observed traffic signage, traffic signals, lane markings, and local regulations in the ground truth map. In further examples, reference points or other points of interest may be further labeled on the autonomy map for additional assistance to the autonomous vehicle. Autonomous vehicles or self-driving vehicles may then utilize the labeled autonomy maps to perform localization, pose, change detection, and various other operations required for autonomous driving on public roads. For example, an autonomous vehicle can reference an autonomy map for determining the traffic rules (e.g., speed limit) at the vehicle's current location, and can dynamically compare live sensor data from an on-board sensor suite with a corresponding autonomy map to safely navigate along a current route.

In various implementations, the computing system can process the sensor data from the fleet vehicles to generate vehicle traces of the fleet vehicles through the road segment. The vehicle traces can indicate the driving behavior of drivers through the road segment, which can correspond to a plurality of behavior classes, including braking behavior, accelerating behavior, standing behavior, coasting behavior, and/or turning behavior through the road segment. The vehicle traces can further indicate a temporal set of acceleration values of each vehicle through the road segment (e.g., positive acceleration, deceleration, continuous speed values). In certain examples, the computing system can further receive sensor data indicating vehicle speed, acceleration, yaw rate, etc. through the road segment, and include this information in the vehicle traces.

As provided herein, the computing system can implement a learning-based approach to classify the driving behaviors of the fleet vehicles through the road segment. In one example, the computing system implements a recurrent neural network to encode sequences of geo-positions of each vehicle through the road segment to derive the corresponding driving patterns and classify the driving behaviors of the vehicles. In such an example, the computing system can temporally and statistically aggregate classified driving behaviors per lane segment by tallying the driving behavior over a period of time. In further examples, the computing system can implement a learning-based approach (e.g., a multi-layer perceptron) that takes the statistical values of the aggregated driving behaviors from competing lanes of the road segment and predicts or otherwise determines a set of right-of-way rules for the competing lanes.

As provided herein, the computing system may store or include one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

According to examples described herein, autonomous driving maps can be generated based at least in part on map data obtained from one or more mapping vehicles operating through the road segment, and/or labeled autonomous driving rules that correspond to at least one of signage or signals along the road segment. Additionally or alternatively, autonomous driving maps or certain elements of the autonomous driving maps (e.g., indicating lane geometry or signage positions) can be generated from fleet vehicles equipped with a set of sensors. Upon determining the set of right-of-way rules for the competing lanes of the road segment, the computing system can obtain the relevant autonomy map containing the road segment and modify the autonomy map to include the set of right-of-way rules for autonomous driving along the road segment. As provided herein, the autonomy map and/or right-of-way rules as determined by the methods described herein can be used by semi-autonomous vehicles, fully autonomous vehicles, and/ or as a safety feature of human-driven vehicles.

Additionally or alternatively, the computing system can process sensor data from the human-driven vehicles operating throughout the region to determine right-of-way rules for each road segment of a road network of the region. Upon determining the right-of-way rules, the computing system can generate a set of autonomous driving maps for autonomous vehicles and/or semi-autonomous vehicles operating throughout the road network based on the right-of-way rules determined for each road segment of the road network. According to such implementations, the road network need not require the use of mapping vehicles and human labeling for autonomy map creation, as the right-of-way rules for all operable roads may be determined by the methods described herein.

Among other benefits, the examples described herein achieve a technical effect of utilizing sensor data from human-driven fleet vehicles to determine human driving behavior for competing lanes of road segments. Examples described herein can generate vehicle traces of the vehicles operating through the road segment, classify the driving behavior, and determine a set of right-of-way rules for the road segment. Upon determining the right-of-way rules, the examples described herein can modify or create autonomy maps for a road network that includes the right-of-way rules for use by semi-autonomous and/or autonomous vehicles for operating throughout the road network. Such examples provide a technical solution to various technical limitations that exist in the field of autonomous vehicle navigation on public road networks. Namely, the reliance on mapping vehicles to generate autonomy map templates can result in obscured signage or traffic signals. Furthermore, reliance on human labeling of these recorded autonomy maps can result in errors in determining right-of-way, which can result in stuck states on board the autonomous vehicles, where the vehicle is unable to proceed due to lack of clarity in the right-of-way rules.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable mediums include permanent memory storage devices, such as hard drives on personal computers or servers. Other examples of computer storage mediums include portable storage units, such as flash memory or magnetic memory. Computers, terminals, network-enabled devices are all examples of machines and devices that utilize processors, memory, and instructions stored on computer-readable mediums. Additionally, examples may be implemented in the form of computer-programs, or a computer usable carrier medium capable of carrying such a program.

Example Computing System

FIG. 1 is a block diagram depicting an example computing system 100 implementing right-of-way determination based on sensor data from fleet vehicles, according to examples described herein. In an embodiment, the computing system 100 can include a control circuit 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 110 and/or computing system 100 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, or any other controller (the term "or" is used herein interchangeably with "and/or").

In an embodiment, the control circuit 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, e.g., a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions, such as instructions to perform the below methods described in connection with of FIGS. 5 and 6.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when a control circuit 110 or other hardware component is executing the modules or computer-readable instructions.

In further embodiments, the computing system 100 can include a communication interface 140 that enables communications over one or more networks 150 to transmit and receive data. In various examples, the computing system 100 can communicate, over the one or more networks, with fleet vehicles using the communication interface 140 to receive sensor data and implement the right-of-way determination methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the computing system 100 can receive sensor data from fleet vehicles over the one or more networks 150 using the communication interface 140. The control circuit 110 can process the sensor data through execution of instructions accessed from the non-transitory computer readable medium 120 to generate vehicle traces of fleet vehicles through a particular road segment having competing lanes, and determining a set of right-of-way rules for the road segment based on the vehicle traces. The control circuit 110 may then use the right-of-way rules to automatically label autonomy maps for use by semi-autonomous or fully autonomous vehicles in navigating through a road network. Further description of the functions of the computing system 100 is provided below.

System Description

Figure 2:
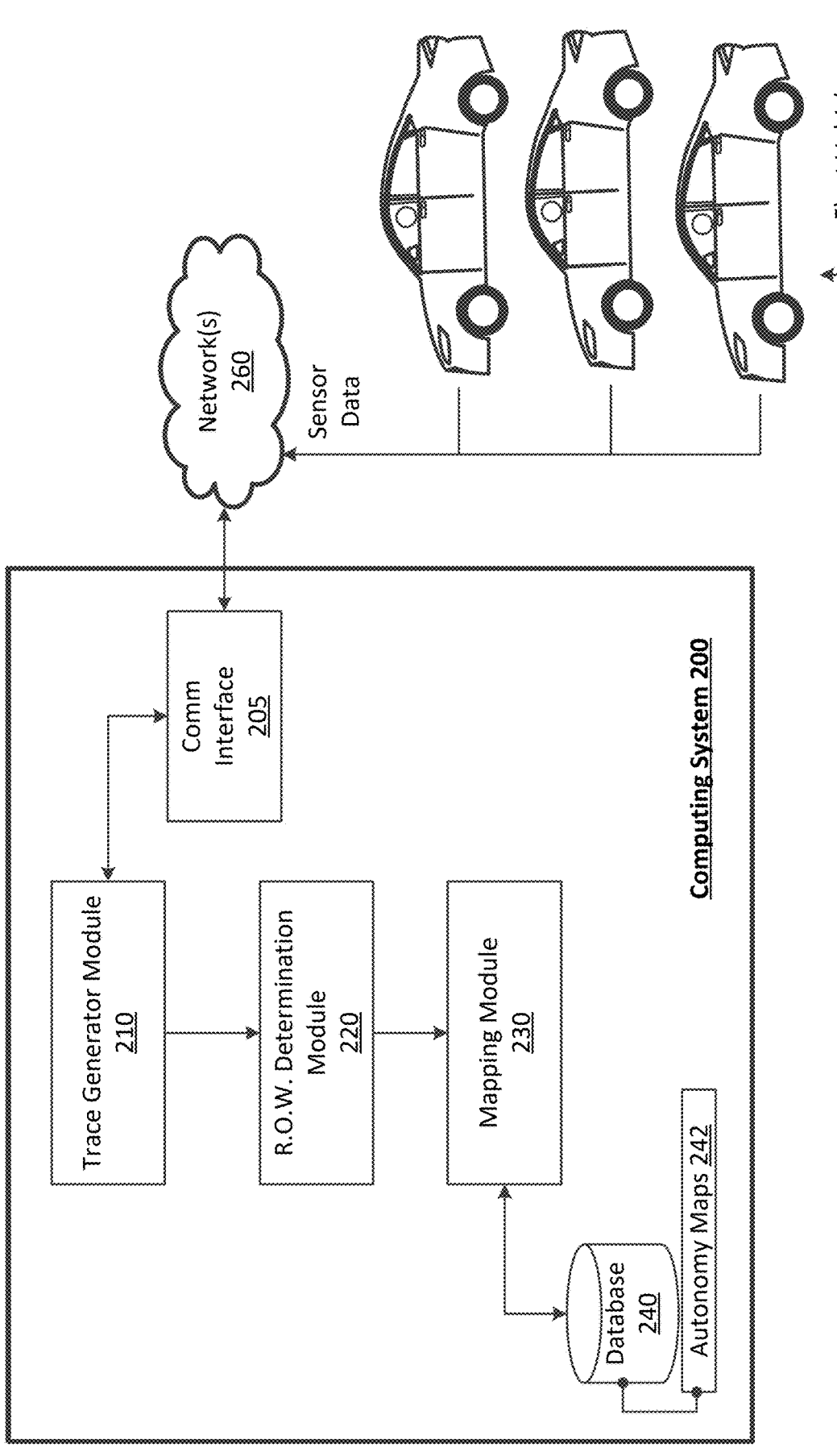
FIG. 2 is a block diagram illustrating an example computing system including specialized modules for implementing right-of-way determination based on sensor data from fleet vehicles, according to examples described herein.

FIG. 2 is a block diagram illustrating an example computing system 200 including functional modules for implementing right-of-way determination based on sensor data from fleet vehicles, according to examples described herein. As provided herein, the computing system 200 can include a communication interface 205 to communicate, over one or more networks 260, with human-driven fleet vehicles 250 to receive sensor data that indicates each vehicle's motion and/or control inputs through a particular road segment. As further provided herein, the sensor data can be received from a set of sensors housed on each vehicle, such as a positioning system (e.g., GPS or other GNSS) and/or one or more odometry sensors (e.g., wheel spin sensors, brake input sensors, steering input sensors, acceleration sensors). As such, the sensor data can comprise real-time position data and/or odometry information (e.g., speed, acceleration, yaw rate) of the fleet vehicles 250 as they traverse through the road segment.

In various implementations, the computing system 200 can include a trace generator module 210, a right-of-way-determination module 220, and a mapping module 230. In further examples, the computing system 200 can include a database 240 storing a set of autonomy maps 242 utilized by autonomous and/or semi-autonomous vehicles for operating throughout a region. Specifically, the autonomy maps 242 can be created based on mapping vehicles that generate map data using a sensor suite (e.g., including LIDAR sensors, image sensors, etc.) as the mapping vehicles travel through a road network on which autonomous vehicles operate. The map data may be appended with one or more layers of labeled data that indicates the specified traffic rules (e.g., speed limits, signage, crosswalk information, traffic signals, etc.) for any given road segment. The autonomous vehicles can continuously compare real-time sensor data generated by an on-board sensor suite with the relevant autonomy maps to perform localization and pose processes that assist the autonomous or semi-autonomous vehicles in operating safely through the road network.

In certain examples, the trace generator module 210 can receive the sensor data from a subset of the fleet vehicles 250 that operate through a particular road segment involving competing lanes, such as a turning lane that merges onto a roadway. The trace generator module 210 can generate vehicle traces of the subset of fleet vehicles 250 through the particular road segment. As described below, in connection with FIGS. 3A and 3B, the vehicle traces can indicate each vehicle's path through the road segment. In further examples, the vehicle traces can be superimposed on map data to indicate the temporal sequence of motion of each vehicle through the road segment, such as traces of acceleration, coasting, deceleration, and turning as the vehicle traverses the road segment.

In various implementations, the right-of-way determination module 220 can process the vehicle traces and sensor data to classify the driving behavior of each vehicle through the road segment. In some examples, the right-of-way determination module 220 can implement a learning-based approach to process the vehicle trace information and derive the driving patterns of the vehicles through the road segment. For example, the right-of-way determination module 220 can execute an artificial neural network (e.g., a recurrent neural network and/or multilayer perceptron) that processes the temporal traces of the vehicle paths through the road segment as input, and outputs a prediction of the right-of-way rule(s) for the road segment. For example, the right-of-way rule determination module 220 can execute an artificial neural network in which the temporal traces of the vehicle paths are received as sequential inputs by certain nodes of the neural network to output predictions of the right-of-way rules for the road segment (e.g., label an autonomy map with the determined right-of-way rules). Upon determining the right-of-way rules, autonomous vehicles and/or advanced driver assistance systems may apply the right-of-way rules in navigating the corresponding road segment.

In further examples, the right-of-way determination module 220 can process the temporal and statistical aggregation of driving behaviors through the road segment and the competing lane(s) with the road segment over a period of time to output the right-of-way rule(s). In still further examples, the right-of-way determination module 220 can be trained with ground truth maps (e.g., recorded by mapping vehicles and labeled based on signage and traffic signals). Accordingly, given a set of vehicle traces through any road segment of a road network on which autonomous vehicles are to operate, the right-of-way determination module 220 can output a predicted or actual right-of-way ruleset for each lane of the road segment.

According to examples described herein, the mapping module 230 can utilize the right-of-way output from the right-of-way determination module 220 to verify labels on an existing autonomy map, modify an existing autonomy map to include the right-of-way rule(s) for the road segment, or generate a new autonomy map for the road segment to include the right-of-way rule(s). In various examples, the mapping module 230 can comprise an autonomy map verifier than determines whether right-of-way rules labeled on existing autonomy maps 242 are accurate. For example, an autonomy map stored in the database 240 or accessed remotely can include the road segment on which the subset of fleet vehicles 250 traveled through. Upon determining the right-of-way rule(s) for the road segment, the mapping module 230 can perform a lookup of the relevant autonomy map that includes the road segment, and compare the labeled right-of-way rule (e.g., as labeled by a human) with the right-of-way rule as outputted by the right-of-way determination module 220. In further examples, if the right-of-way rules do not match, the mapping module 230 can automatically flag the discrepancy for further processing and labeling, or an automatically relabel the autonomy with the right-of-way rule as determined by the right-of-way determination module 220. In further examples, the right-of-way rules can be used to validate other traffic ruling elements in an autonomy map, since right-of-way rules are based upon such elements. For example, labels in an autonomy map that identify and/or classify traffic signals, traffic signs, stop line markings, crosswalks, etc. can be validated by the mapping module 230 based on the right-of-way rule as determined by the right-of-way determination module 220.

Additionally or alternatively, the mapping module 230 can automatically label existing autonomy maps recorded by mapping vehicles with the right-of-way rules outputted by the right-of-way determination module 220. For example, the mapping module 230 can replace certain human labelling functions in creating autonomy maps 242 for autonomous and/or semi-autonomous vehicles. In such an example, mapping vehicles may still be utilized to record ground truth maps of a given road network, and the ground truth maps may be automatically imparted with right-of-way information at each road segment involving competing lanes by the mapping module 230. In still further examples, the mapping module 230 can utilize the right-of-way outputs from the right-of-way determination module 220 and generate autonomy maps using road network data (e.g., existing ground truth maps or virtualized ground truth maps based on road network information).

It is contemplated that the right-of-way determination methods described throughout the present disclosure can be performed for any road segment involving competing lanes, and can be used to supplement existing labeling functions, or replace existing labeling functions for autonomy maps 242 (e.g., human labeling). It is further contemplated that new autonomy maps may be generated by the mapping module 230 using the methods described herein. For example, in addition to determining right-of-way rules, the computing system 200 can further infer road signage rules, speed limits, traffic signal locations, crosswalk locations, and the like, based on the sensor data and vehicle traces of fleet vehicles 250 through specified road segments. As such, the use of mapping vehicles and human or automated labeling of ground truth maps may be supplemented or eliminated using the methods described herein.

It is further contemplated that the right-of-way determination methods described herein can further utilize external sensor data from sensors in fixed positions with fields of view that include road segments with competing lanes (e.g., image sensors, LIDAR sensors, radar, sonar, infrared, etc.). Thus, the trace generator module 210 can supplement the sensor data received from the fleet vehicles 250 with additional sensor information from the fixed sensors located proximate to the road segments to determine right-of-way rules.

Vehicle Traces

Figures 3A, 3B:
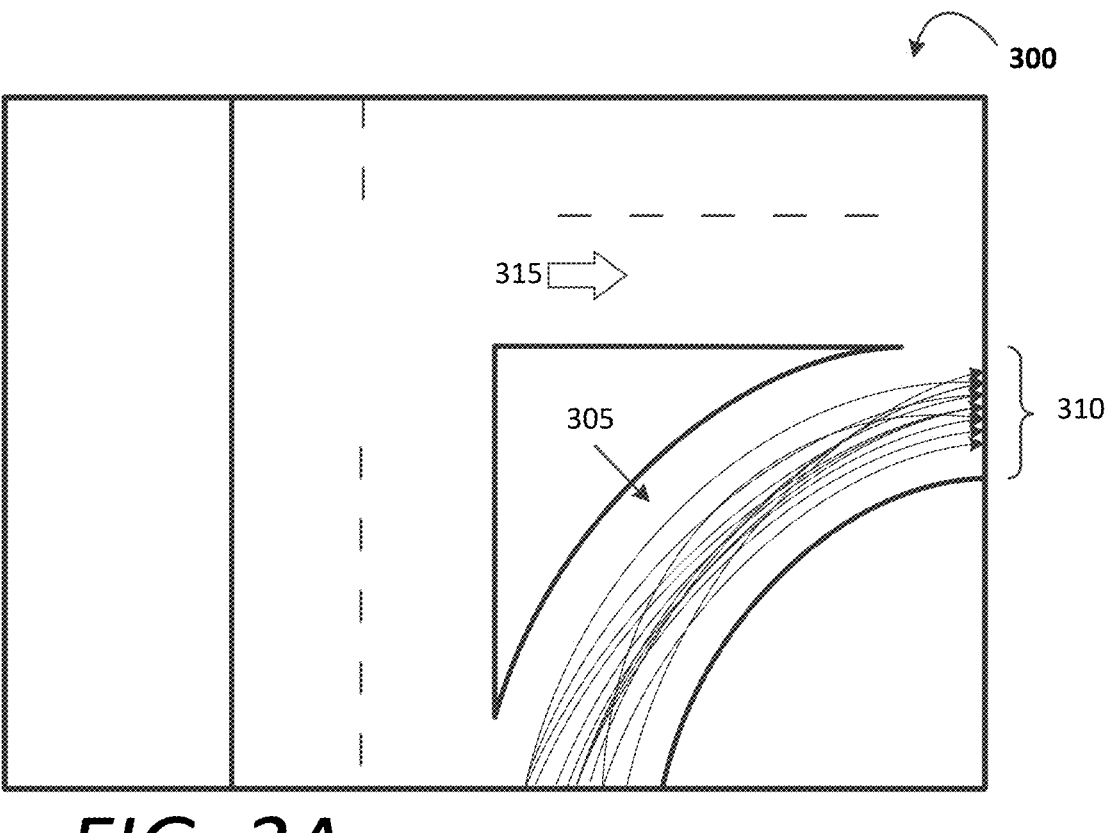
FIG. 3A depicts a mapped road segment in which vehicle traces are superimposed on map data based on sensor data from fleet vehicles, according to examples described herein.
FIG. 3B depicts a mapped road segment in which acceleration values of fleet vehicles are superimposed on map data based on the sensor data from the fleet vehicles, according to examples described herein.

FIG. 3A depicts a mapped road segment 305 in which vehicle traces 310 are superimposed on map data 300 based on sensor data from fleet vehicles, according to examples described herein. In the example shown in FIG. 3A, the road segment 305 merges onto a competing lane 315, and the vehicle traces 310 include the temporal positions of each fleet vehicle through the road segment. As described herein, the vehicle traces 310 are matched to the road segment 305 (e.g., superimposed onto the map data 300) to indicate the paths that the fleet vehicles take through the road segment 305. As described below with respect to FIG. 3B, the vehicle traces 310 can further include information corresponding to acceleration values of the fleet vehicles through the road segment 305.

FIG. 3B depicts the road segment 305 in which acceleration values of the fleet vehicles are superimposed on map data 300 based on the sensor data from the fleet vehicles, according to examples described herein. In the example shown in FIG. 3B, the vehicle traces 310 in FIG. 3A can contain additional sensor information (e.g., position data over time, wheel spin information, speed and acceleration data, etc.) that can be used by the computing system 200 to generate positional acceleration values 360 and deceleration values 370 (and coasting traces) for the fleet vehicles as they progress through the road segment 305. As described herein, the computing system 200 can analyze the vehicle traces 310, the acceleration values 360, and deceleration values 370 to determine the right-of-way rule between the road segment 305 and the competing lane 315. Specifically, the computing system 200 can analyze the vehicle traces 310 and sensor information encoded therein (e.g., acceleration and deceleration values 360, 370) to determine or classify the driving behavior of the fleet vehicles. As shown in FIG. 3B, the acceleration and deceleration values 360, 370 of the fleet vehicles through the road segment 305 indicate a braking pattern prior to accelerating to merge onto the competing lane, which can indicate that that the competing lane 315 has right-of-way over the road segment.

Figure 4:
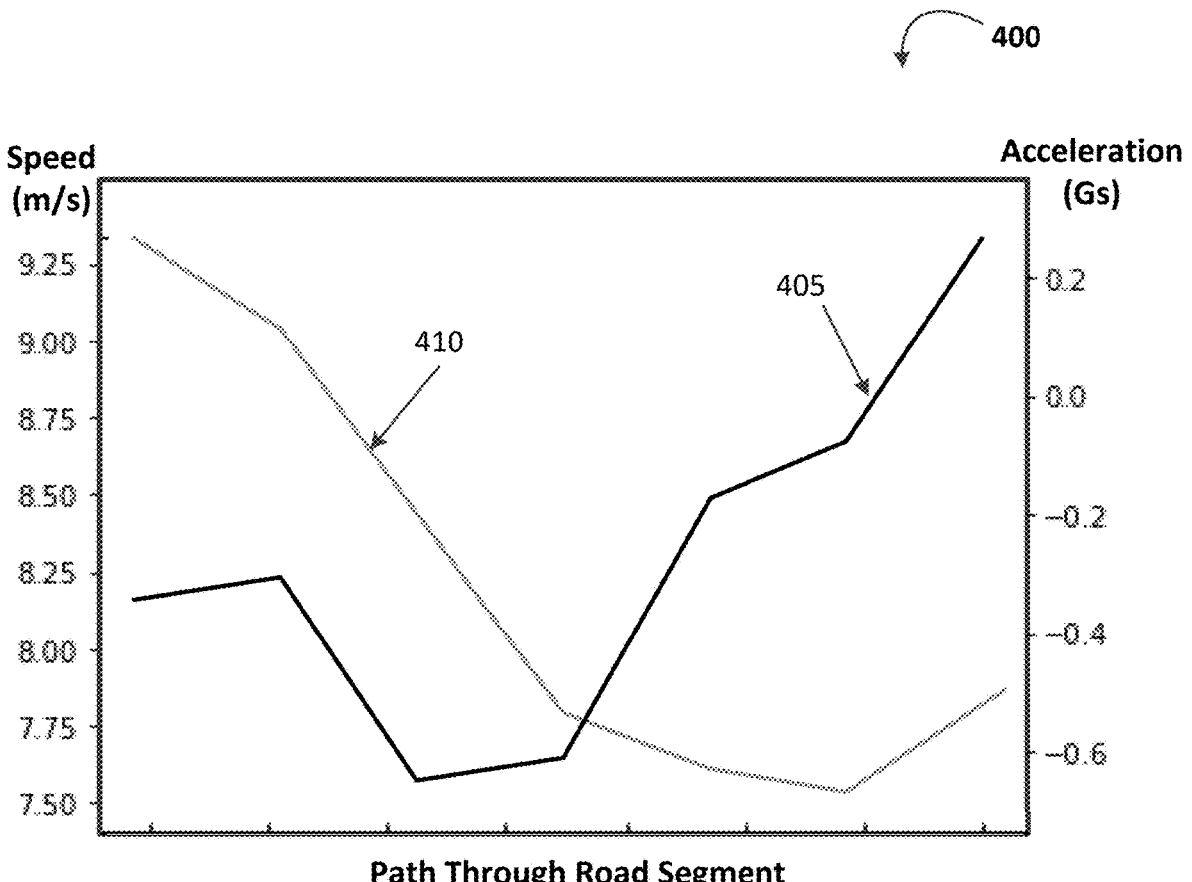
FIG. 4 depicts a graph describing speed and acceleration of a respective vehicle trace through a road segment, according to examples described herein.

FIG. 4 depicts a graph 400 describing speed 410 and acceleration 405 of a respective vehicle trace through a road segment, according to examples described herein. The speed 410 and acceleration 405 lines shown in FIG. 4 can correspond to a particular vehicle trace 310 of FIG. 3A and the acceleration and deceleration values 360, 370 of a particular fleet vehicle traveling through the road segment 305. As shown in FIG. 4, the information encoded in the vehicle trace 310 can include temporal values of the vehicle's speed 410 through the road segment 305, as well as temporal values of the vehicle's acceleration 405. In the examples shown in FIG. 4, the fleet vehicle decelerates and lowers speed as it progresses through the road segment 305, and then accelerates as the fleet vehicle exits the road segment 305. As provided herein, the computing system 200 can process this vehicle trace information from multiple fleet vehicles traveling through the same road segment 305 to determine right-of-way rules for the road segment 305 and any competing lanes 315.

Methodology

Figure 5:
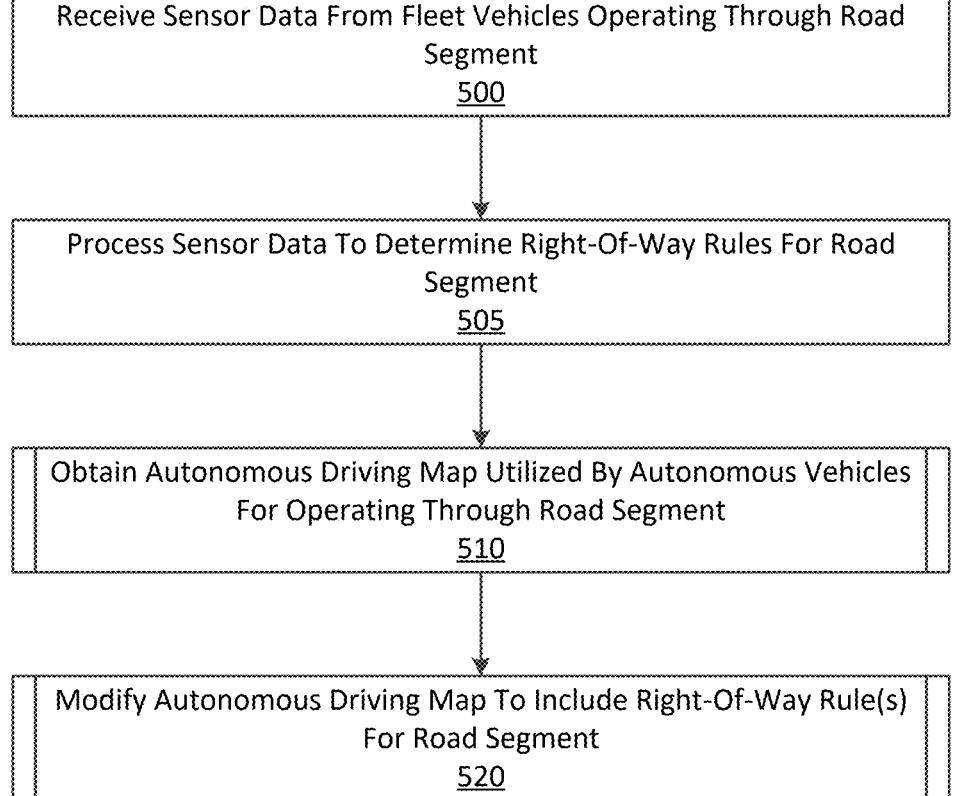
FIG. 5 is a flow chart describing a method of determining right-of-way for a road segment based on sensor data from fleet vehicles, according to examples described herein.
Figure 6:
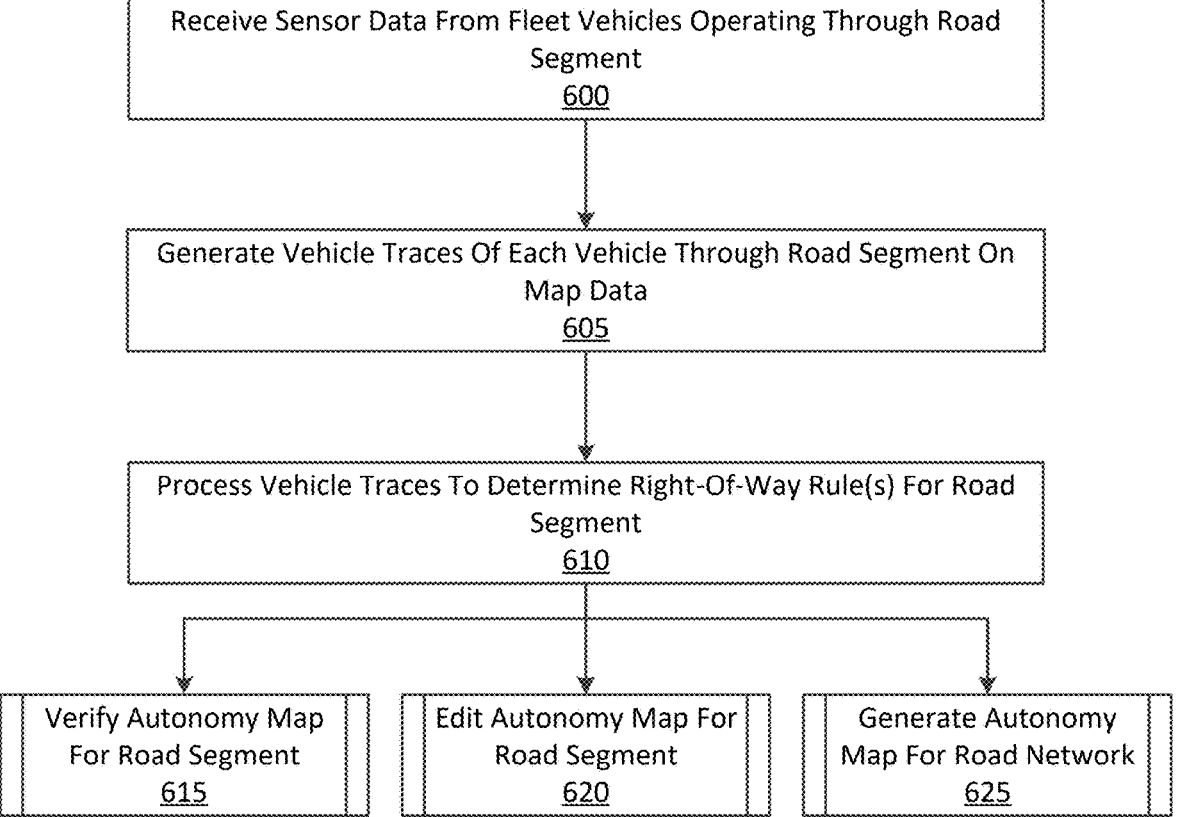
FIG. 6 is a flow chart describing a method of determining right-of-way for autonomous vehicles through a road segment by generating vehicle traces based on sensor data from fleet vehicles, according to examples described herein.

FIGS. 5 and 6 are flow chart describing methods of determining right-of-way for a road segment based on sensor data from fleet vehicles, according to examples described herein. In the below discussion of the methods of FIGS. 5 and 6, reference may be made to reference characters representing certain features described with respect to the systems diagrams of FIGS. 1 and 2. Furthermore, the steps described with respect to the flow charts of FIGS. 5 and 6 may be performed by the computing systems 100, 200 as shown and described with respect to FIGS. 1 and 2. Further still, certain steps described with respect to the flow charts of FIGS. 5 and 6 may be performed prior to, in conjunction with, or subsequent to any other step, and need not be performed in the respective sequences shown.

Referring to FIG. 5, at block 500, the computing system 200 can receive sensor data from fleet vehicles 250 operating through a road segment. As described herein, the sensor data can include position data indicating the temporal positions of each fleet vehicle 250 as the fleet vehicle 250 traverses through the road segment. In further examples, the sensor data can include wheel spin information, speed and/or acceleration information, braking input data, yaw rate information, and the like. At block 505, the computing system 200 can process the sensor data to determine a set of one or more right-of-way rules for the road segment. As an example, an intersection between two roads can include a two-way stop controlled by respective stop signs on one of the roads. Without knowledge of this signage information, the computing system 200 can infer the existence of the stop signs, and thus right-of-way, on the relevant road based on the sensor data from the fleet vehicles. The determination of right-of-way for autonomous vehicles is discussed in more detail with respect to FIG. 6.

In certain implementations, at block 510, the computing system can obtain an autonomous driving map 242 utilized by autonomous and/or semi-autonomous vehicles for operating through the road segment. As described herein, the autonomous driving map 242 can comprise a ground truth map that includes map data recorded by a mapping vehicle and labeled (e.g., human-labeled) to indicate traffic rules for the road segment (e.g., based on road signage and traffics signals identified by a human). Autonomous vehicles, semi-autonomous vehicles, or other self-driving vehicles may utilize the labeled autonomy maps to perform localization, pose, change detection, and various other operations required for autonomous driving through the road segment. As further provided herein, the autonomous driving map 242 may be accessed remotely from a third-party database, or may be obtained locally from an autonomy map database 240.

At block 520, the computing system 200 can then modify the autonomous driving map 242 to include the set of one or more right-of-way rules for the road segment as determined from the sensor data from the fleet vehicles 250. In certain examples, modification of the autonomous driving map 242 can comprise automatically labeling the autonomous driving map to include the right-of-way rules for the road segment.

Additionally or alternatively, modification of the autonomous driving map 242 can involve the automatic labeling of a ground truth map—which includes raw sensor data recorded by a mapping vehicle—to include the right-of-way rules as determined from the sensor data of the fleet vehicles 250. In further examples, the computing system 200 can verify right-of-way labels (e.g., as inputted by a human) on autonomous driving maps, and/or can generate new autonomous driving maps using determined right-of-way information as well as other known information of the road network (e.g., signage, signal locations, speed limits, etc.). In further implementations, the computing system 200 can replace incorrect right-of-way rules (e.g., as inputted by a human), or can input right-of-way rules into autonomous driving maps 242 that do not yet include them.

FIG. 6 is a flow chart describing a method of determining right-of-way for autonomous vehicles through a road segment by generating vehicle traces based on sensor data from fleet vehicles, according to examples described herein. Referring to FIG. 6, at block 600, the computing system 200 can receive sensor data from fleet vehicles 250 operating through a particular road segment. At block 605, the computing system 200 can further generate vehicle traces of each vehicle through the road segment on map data. For example, the vehicle traces can indicate each vehicle's path through the road segment as well as temporal and positional acceleration and deceleration values (as well as coasting values) as the vehicles traverse the road segment. In further examples, the computing system 200 can encode additional data in the vehicle traces, such as brake input information, yaw rate, wheel speed information, and the like.

In further examples, the vehicle traces can indicate driving behaviors corresponding to a plurality of behavior classes including braking behavior, accelerating behavior, standing behavior, coasting behavior, and turning behavior classes of the subset of human-driven vehicles through the road segment. The computing system 200 can process the vehicle traces to determine driving patterns for the fleet vehicles 250 operating through the road segment, and can classify one or more driving behaviors that are indicative of one more right-of-way rules for the road segment.

At block 610, the computing system 200 can process the vehicle traces to determine a set of one or more right-of-way rules for the road segment. The set of right-of-way rules can indicate whether the road segment (e.g., a specific lane) has right-of-way over a competing road segment or lane. In further examples, the road segment may have multiple competing lanes with varying rights-of-way. Thus, the set of right-of-way rules can indicate that a particular road segment has right-of-way over a first competing lane, but must defer right-of-way to a second competing lane. Accordingly, based on the vehicle traces, the computing system 200 can determine, for each specific lane of a competing lane area, the right-of-way rule(s) for each of the competing lanes. In certain implementations, the computing system 200 can generate time-specific right-of-way rules (e.g., when time-stamp information is included in the sensor data). For example, the computing system 200 can determine time blocks in which traffic signals control right-of-way rules for a particular road segment (e.g., during daytime hours), and time blocks in which traffic signals are deactivated and static signage is relied upon for right-of-way.

In various implementations, the computing system 200 can act as a label verifier for autonomous driving maps 242 that have already been labeled with right-of-way rules (e.g., via human labeling). At block 615, the computing system 200 verify the right-of-way rule(s) labeled on an existing autonomous driving map 242 for the road segment. Additionally or alternatively, at block 620, the computing system 200 can edit or modify an autonomous driving map or an unlabeled ground truth map to include the right-of-way rule(s) for the road segment.

In further examples, at block 625, the computing system 200 can generate one or more autonomous driving maps to include right-of-way rules for an entire road network based on the processes described herein. In such an example, the computing system 200 can process sensor data from any number of road segments having right-of-way conflicts to determine the right-of-way rules for the entire road network (e.g., an autonomous driving grid in which autonomous vehicles are permitted to operate). The computing system 200 may then supplement or replace existing autonomous mapping and labeling methods currently used in the field.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A computing system comprising:
a communication interface communicating, over one or more networks, with human-driven vehicles operating throughout a region;
one or more processors;
a memory storing instructions that, when executed by the one or more processors, cause the computing system to automatically label a set of autonomous driving maps utilized by autonomous or semi-autonomous vehicles operating in the region, to reflect accurate and up-to-date right-of-way rules for one or more road segments of the region, by:
receiving, over the one or more networks, sensor data comprising one or more control inputs and one or more vehicle motion values from a subset of the human-driven vehicles operating through a road segment within the region, the sensor data being generated by a set of odometry sensors of each of the subset of human-driven vehicles, the set of odometry sensors comprising a positioning system, a braking input sensor, and a steering input sensor, of each of the subset of human-driven vehicles;
processing the sensor data generated by the set of odometry sensors of each of the subset of human-driven vehicles to determine a set of vehicle traces through the road segment for the subset of human-driven vehicles, each vehicle trace of the set including positional acceleration and deacceleration values determined from sensor data of the respective human-driven vehicle;
determining braking and acceleration patterns of human-driven vehicles traversing the road segment based on the positional acceleration and deacceleration values;

based at least in part on the set of vehicle traces and the determined braking and acceleration patterns, generating a set of right-of-way rules for autonomous or semi-autonomous vehicles driving through the road segment to merge onto or off of a freeway, the set of right-of-way rules indicating when an autonomous or semi-autonomous vehicle traversing the road segment is to yield to another vehicle in a competing road segment;
performing a lookup of a database that stores the set of autonomous driving maps, to identify an autonomous map of the set that includes the road segment;
determining whether the determined set of right-of-way rules for the road segment match an existing set of right-of-way rules previously determined for the road segment of the identified autonomous driving map;
modifying the identified autonomous driving map based on the generated set of right-of-way rules for the road segment when the generated set of right-of-way rules for the road segment are determined to not match the existing set of right-of-way rules; and
controlling an autonomous vehicle or a semi-autonomous vehicle using the generated set of right-of-way rules.

2. The computing system of claim 1, wherein the executed instructions cause the computing system to generate the set of right-of-way rules by inputting vehicle trace data corresponding to one or more vehicle traces of the set of vehicle traces into a machine learning model trained on aggregate driving behavior data, the machine learning model processing the vehicle trace data to output the set of right-of-way rules.

3. The computing system of claim 1 wherein the executed instructions cause the computing system to superimpose the set of vehicle traces on map data to further determine the set of right-of-way rules.

4. The computing system of claim 1, wherein the identified autonomous driving map includes (i) map data obtained from one or more mapping vehicles operating through the road segment, and/or (ii) labeled autonomous driving rules that correspond to at least one of signage or signals along the road segment.

5. The computing system of claim 1, wherein the executed instructions cause the computing system to process vehicle trace data based on sensor data from the human-driven vehicles operating throughout the region to determine right-of-way rules for each road segment of a road network of the region, and wherein the executed instructions further cause the computing system to:
label a set of autonomous driving maps for autonomous or semi- autonomous vehicles driving throughout the road network based on the right-of-way rules determined for each road segment of the road network.

6. The computing system of claim 1, wherein modifying the identified autonomous driving map includes labelling or relabeling the identified autonomous driving map based on the generated set of right-of-way rules.

7. The computing system of claim 1, wherein modifying the identified autonomous driving map includes replacing a label for one or more existing right of way rules that are incorrect.

8. A non-transitory computer readable medium storing instructions that, when executed by one or more processors of a computing system, cause the computing system to:
communicating with human-driven vehicles operating throughout a region;
automatically labeling a set of autonomous driving maps utilized by autonomous or semi-autonomous vehicles operating in the region, to reflect accurate and up-to-date right of way rules for one or more road segments of the region, by performing operations that include:

receiving, over one or more networks, sensor data comprising one or more control inputs and one or more vehicle motion values from a subset of the human-driven vehicles operating through a road segment within the region, the sensor data being generated by a set of odometry sensors of each of the subset of human-driven vehicles, the set of odometry sensors comprising a positioning system, a braking input sensor, and a steering input sensor, of each of the subset of human-driven vehicles;

processing the sensor data generated by the set of odometry sensors of each of the subset of human-driven vehicles to determine a set of vehicle traces through the road segment for the subset of human-driven vehicles, each vehicle trace of the set including positional acceleration and deacceleration values determined from sensor data of the respective human-driven vehicle;

determining braking and acceleration patterns of human-driven vehicles traversing the road segment based on the positional acceleration and deacceleration values;

based at least in part on the set of vehicle traces and the determined braking and accelerating patterns, generating a set of right-of-way rules for autonomous or semi-autonomous vehicles driving through the road segment to merge onto or off of a freeway, the set of right-of-way rules indicating when an autonomous or semi-autonomous vehicle traversing the road segment is to yield to another vehicle in a competing road segment;

performing a lookup of a database that stores the set of autonomous driving maps, to identify an autonomous map of the set that includes the road segment;

determining whether the determined set of right-of-way rules for the road segment match an existing set of right-of-way rules previously determined for the road segment of the identified autonomous driving map; and modifying the identified autonomous driving map based on the generated set of right-of-way rules for the road segment when the generated set of right-of-way rules for the road segment are determined to not match the existing set of right-of-way rules; and controlling an autonomous vehicle or a semi-autonomous vehicle using the generated set of right-of-way rules.

9. The non-transitory computer readable medium of claim 8, wherein the executed instructions cause the computing system to generate the set of right-of-way rules by inputting vehicle trace data corresponding to one or more vehicle traces of the set of vehicle traces into a machine learning model trained on aggregate driving behavior data, the machine learning model processing the vehicle trace data to output the set of right-of-way rules.

10. The non-transitory computer readable medium of claim 8, wherein the executed instructions cause the computing system to superimpose the set of vehicle traces on map data to further determine the set of right-of-way rules.

11. The non-transitory computer readable medium of claim 8, wherein the identified autonomous driving map includes (i) map data obtained from one or more mapping vehicles operating through the road segment, and (ii) labeled autonomous driving rules that correspond to at least one of signage or signals along the road segment.

12. The non-transitory computer readable medium of claim 8, wherein the executed instructions cause the computing system to process vehicle trace data based on sensor data from human-driven vehicles operating throughout the region to determine right-of-way rules for each road segment of a road network of the region, and wherein the executed instructions further cause the computing system to:

generate a set of autonomous driving maps for autonomous or semi-autonomous vehicles driving throughout the road network based on the right-of-way rules determined for each road segment of the road network.

13. The non-transitory computer readable medium of claim 8, wherein modifying the identified autonomous driving map includes labelling or relabeling the identified autonomous driving map based on the generated set of right-of-way rules.

14. The non-transitory computer readable medium of claim 8, wherein modifying the identified autonomous driving map includes replacing a label for one or more existing right of way rules that are incorrect.

15. A computer-implemented method performed by one or more processors and comprising:

communicating with human-driven vehicles operating throughout a region;

automatically labeling a set of autonomous driving maps utilized by autonomous or semi-autonomous vehicles operating in the region, to reflect accurate and up-to-date right-of-way rules for one or more road segments of the region, by:

receiving, over one or more networks, sensor data comprising one or more control inputs and one or more vehicle motion values from a subset of the human-driven vehicles operating through a road segment within the region, the sensor data being generated by a set of odometry sensors of each of the subset of human-driven vehicles, the set of odometry sensors comprising a positioning system, a braking input sensor, and a steering input sensor of each of the subset of human-driven vehicles;

processing the sensor data generated by the set of odometry sensors of each of the subset of human-driven vehicles to determine a set of vehicle traces through the road segment for the subset of human-driven vehicles, each vehicle trace of the set including positional acceleration and deacceleration values determined from sensor data of the respective human-driven vehicle;

determining braking and acceleration patterns of human-driven vehicles traversing the road segment based on the positional acceleration and deacceleration values;

based at least in part on the set of vehicle traces and the determined braking and accelerating patterns, generating a set of right-of-way rules for autonomous or semi-autonomous vehicles driving through the road segment to merge onto or off of a freeway, the set of right-of-way rules indicating when an autonomous or semi-autonomous vehicle traversing the road segment is to yield to another vehicle in a competing road segment;

performing a lookup of a database that stores the set of autonomous driving maps, to identify an autonomous map of the set that includes the road segment;

determining whether the determined set of right-of-way rules for the road segment match an existing set of right-of-way rules previously determined for the road segment of the identified autonomous driving map; and modifying the identified autonomous driving map based on the generated set of right-of-way rules for the road segment when the generated set of right-of-way rules for the road segment are determined to not match the existing set of right-of-way rules; and controlling an autonomous vehicle or a semi-autonomous vehicle using the generated set of right-of-way rules.

16. The computer-implemented method of claim 15, wherein generating the set of right-of-way rules includes inputting vehicle trace data corresponding to one or more vehicle traces of the set of vehicle traces into a machine learning model trained on aggregate driving behavior data, the machine learning model processing the vehicle trace data to output the set of right-of-way rules.

17. The computer-implemented method of claim 16, further comprising superimposing the set of vehicle traces on map data to further determine the set of right-of-way rules.

18. The computer-implemented method of claim 15, wherein the identified autonomous driving map includes (i) map data obtained from one or more mapping vehicles operating through the road segment, and (ii) labeled autonomous driving rules that correspond to at least one of signage or signals along the road segment.

19. The computer-implemented method of claim 15, further comprising processing vehicle trace data based on sensor data from human-driven vehicles operating throughout the region to determine right-of-way rules for each road segment of a road network of the region, the method further comprising:

generating a set of autonomous driving maps for autonomous or semi-autonomous vehicles driving throughout the road network based on the right-of-way rules determined for each road segment of the road network.

20. The computer-implemented method of claim 15, wherein modifying the identified autonomous driving map includes labelling or relabeling the identified autonomous driving map based on the generated set of right-of-way rules, including replacing a label for one or more existing right of way rules that are incorrect.

\* \* \* \* \*